(12) United States Patent
Bucknor et al.

(10) Patent No.: US 7,674,201 B2
(45) Date of Patent: Mar. 9, 2010

(54) WIDE RATIO TRANSMISSIONS HAVING MULTIPLE GEAR RATIOS

(75) Inventors: Norman K. Bucknor, Troy, MI (US); Madhusudan Raghavan, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 179 days.

(21) Appl. No.: 11/744,473

(22) Filed: May 4, 2007

(65) Prior Publication Data

US 2008/0274852 A1   Nov. 6, 2008

(51) Int. Cl.
    *F16H 3/44* (2006.01)
(52) U.S. Cl. ........................... 475/284; 475/288
(58) Field of Classification Search .......... 475/275–290
    See application file for complete search history.

(56) References Cited

U.S. PATENT DOCUMENTS

| | | | |
|---|---|---|---|
| 6,375,592 B1 | 4/2002 | Takahashi et al. | |
| 6,425,841 B1 | 7/2002 | Haka | |
| 6,471,615 B1 | 10/2002 | Naraki et al. | |
| 6,558,287 B2 | 5/2003 | Hayabuchi et al. | |
| 6,773,370 B2 * | 8/2004 | Martyka et al. | 475/275 |
| 6,945,900 B2 | 9/2005 | Usoro et al. | |
| 6,962,548 B2 | 11/2005 | Bucknor et al. | |
| 7,488,268 B2 * | 2/2009 | Wittkopp et al. | 475/284 |
| 2003/0083173 A1 * | 5/2003 | Miyazaki et al. | 475/280 |
| 2003/0162625 A1 * | 8/2003 | Raghavan et al. | 475/280 |
| 2005/0026738 A1 * | 2/2005 | Diosi et al. | 475/275 |

FOREIGN PATENT DOCUMENTS

| | | |
|---|---|---|
| JP | 2002188694 A | 7/2002 |
| JP | 2005036828 A | 2/2005 |
| JP | 2007071287 A | 3/2007 |

* cited by examiner

*Primary Examiner*—Roger Pang

(57) ABSTRACT

The transmission has a plurality of members that can be utilized in powertrains to provide at least seven forward speed ratios and one reverse speed ratio. The transmission includes three planetary gear sets having six or seven torque-transmitting mechanisms and three fixed interconnections. The powertrain includes an engine and torque converter that is continuously connected to at least one of the planetary gear members and an output member that is continuously connected with another one of the planetary gear members. The six or seven torque-transmitting mechanisms provide interconnections between various gear members and with the transmission housing, and are operated in combinations of two to establish at least seven forward speed ratios and at least one reverse speed ratio.

9 Claims, 7 Drawing Sheets

Sample Design: $\dfrac{N_{R_1}}{N_{S_1}} = 3.00,\quad \dfrac{N_{R_2}}{N_{S_2}} = 2.50,\quad \dfrac{N_{R_3}}{N_{S_3}} = 2.30$ (X = engaged clutch)

|  | Ratios | 50 | 52 | 54 | 56 | 57 | 58 |
|---|---|---|---|---|---|---|---|
| Reverse | -3.00 | X |  |  | X |  |  |
| Neutral | 0.00 | X |  |  |  |  |  |
| 1 | 5.02 | X |  | X |  |  |  |
| 2 | 3.15 |  | X | X |  |  |  |
| 3 | 2.25 |  |  | X |  |  | X |
| 4 | 1.94 |  |  | X | X |  |  |
| 5 | 1.44 |  |  | X |  | X |  |
| 6 | 1.00 |  |  |  |  | X | X |
| 7 | 0.75 |  | X |  |  | X |  |

| Ratio Spread | 6.69 |
|---|---|
| Ratio Steps |  |
| Rev/1 | -0.60 |
| 1/2 | 1.60 |
| 2/3 | 1.40 |
| 3/4 | 1.16 |
| 4/5 | 1.35 |
| 5/6 | 1.44 |
| 6/7 | 1.33 |

Sample Design: $\frac{N_{R_1}}{N_{S_1}} = 2.00,\quad \frac{N_{R_2}}{N_{S_2}} = 2.70,\quad \frac{N_{R_3}}{N_{S_3}} = 2.40$ (X = engaged clutch)

|   | Ratios | 150 | 152 | 154 | 156 | 157 | 158 |
|---|---|---|---|---|---|---|---|
| Reverse | -7.40 | X |   |   |   |   | X |
| Neutral | 0.00 | X |   |   |   |   |   |
| 1 | 5.24 | X |   | X |   |   |   |
| 2 | 3.44 |   | X | X |   |   |   |
| 3 | 2.17 |   |   | X |   |   | X |
| 4 | 1.81 |   |   | X | X |   |   |
| 5 | 1.42 |   |   | X |   | X |   |
| 6 | 1.00 |   |   |   |   | X | X |
| 7 | 0.67 |   | X |   |   | X |   |

| Ratio Spread | 7.86 |
|---|---|
| Ratio Steps |   |
| Rev/1 | -1.41 |
| 1/2 | 1.52 |
| 2/3 | 1.59 |
| 3/4 | 1.20 |
| 4/5 | 1.28 |
| 5/6 | 1.42 |
| 6/7 | 1.50 |

Sample Design: $\dfrac{N_{R_1}}{N_{S_1}} = 2.88$, $\dfrac{N_{R_2}}{N_{S_2}} = 2.09$, $\dfrac{N_{R_3}}{N_{S_3}} = 2.23$ (X = engaged clutch)

|  | Ratios | 250 | 252 | 254 | 256 | 257 | 258 |
|---|---|---|---|---|---|---|---|
| Reverse | -2.88 | X |  |  | X |  |  |
| Neutral | 0.00 | X |  |  |  |  |  |
| 1 | 4.48 | X |  | X |  |  |  |
| 2 | 2.92 |  | X | X |  |  |  |
| 3 | 2.38 |  |  | X |  |  | X |
| 4 | 1.90 |  |  | X | X |  |  |
| 5 | 1.45 |  |  | X |  | X |  |
| 6 | 1.00 |  |  |  | X | X |  |
| 7 | 0.74 |  | X |  |  | X |  |

| Ratio Spread | 6.05 |
|---|---|
| Ratio Steps |  |
| Rev/1 | -0.64 |
| 1/2 | 1.53 |
| 2/3 | 1.22 |
| 3/4 | 1.26 |
| 4/5 | 1.31 |
| 5/6 | 1.45 |
| 6/7 | 1.35 |

Sample Design: $\dfrac{N_{R_1}}{N_{S_1}} = 2.77$, $\dfrac{N_{R_2}}{N_{S_2}} = 2.40$, $\dfrac{N_{R_3}}{N_{S_3}} = 1.72$ (X = engaged clutch)

| | Ratios | 350 | 352 | 354 | 356 | 357 | 358 |
|---|---|---|---|---|---|---|---|
| Reverse | -2.77 | X | | | X | | |
| Neutral | 0.00 | X | | | | | |
| 1 | 5.44 | X | | X | | | |
| 2 | 3.24 | | X | X | | | |
| 3 | 2.44 | | | X | | | X |
| 4 | 1.80 | | | X | X | | |
| 5 | 1.36 | | | X | | X | |
| 6 | 1.00 | | | | X | X | |
| 7 | 0.74 | | X | | | X | |

| Ratio Spread | 7.40 |
|---|---|
| Ratio Steps | |
| Rev/1 | -0.51 |
| 1/2 | 1.68 |
| 2/3 | 1.33 |
| 3/4 | 1.36 |
| 4/5 | 1.32 |
| 5/6 | 1.36 |
| 6/7 | 1.36 |

Sample Design: $\dfrac{N_{R_1}}{N_{S_1}} = 3.00$, $\dfrac{N_{R_2}}{N_{S_2}} = 2.60$, $\dfrac{N_{R_3}}{N_{S_3}} = 2.30$ (X = engaged clutch)

|  | Ratios | 450 | 452 | 454 | 456 | 457 | 458 |
|---|---|---|---|---|---|---|---|
| Reverse | -3.00 | X |  |  | X |  |  |
| Neutral | 0.00 | X |  |  |  |  |  |
| 1 | 5.17 | X |  | X |  |  |  |
| 2 | 3.60 | X |  |  |  |  | X |
| 3 | 3.22 |  | X | X |  |  |  |
| 4 | 1.95 |  |  | X | X |  |  |
| 5 | 1.65 |  | X |  |  |  | X |
| 6 | 1.44 |  |  | X |  | X |  |
| 7 | 1.00 |  |  |  | X | X |  |
| 8 | 0.75 |  | X |  |  | X |  |

| Ratio Spread | 6.89 |
|---|---|
| Ratio Steps |  |
| Rev/1 | -0.58 |
| 1/2 | 1.43 |
| 2/3 | 1.12 |
| 3/4 | 1.65 |
| 4/5 | 1.18 |
| 5/6 | 1.15 |
| 6/7 | 1.43 |
| 7/8 | 1.33 |

Sample Design: $\frac{N_{R_1}}{N_{S_1}} = 2.88$, $\frac{N_{R_2}}{N_{S_2}} = 2.09$, $\frac{N_{R_3}}{N_{S_3}} = 2.23$ (X = engaged clutch)

| | Ratios | 550 | 552 | 554 | 556 | 557 | 558 | 559 |
|---|---|---|---|---|---|---|---|---|
| Reverse | -2.88 | X | | | X | | | |
| Neutral | 0.00 | X | | | | | | |
| 1 | 4.48 | X | | X | | | | |
| 2 | 3.09 | X | | | | | | X |
| 3 | 2.92 | | X | X | | | | |
| 4 | 2.39 | | | X | | X | | |
| 5 | 1.90 | | | X | X | | | |
| 6 | 1.54 | | X | | | | | X |
| 7 | 1.45 | | | X | | X | | |
| 8 | 1.00 | | | | | X | X | |
| 9 | 0.74 | | X | | | X | | |

| Ratio Spread | 6.05 |
|---|---|
| Ratio Steps | |
| Rev/1 | -0.64 |
| 1/2 | 1.53 |
| 2/3 | 1.22 |
| 3/4 | 1.26 |
| 4/5 | 1.31 |
| 5/6 | 1.45 |
| 6/7 | 1.35 |

| Ratio Spread | 6.05 |
|---|---|
| Ratio Steps | |
| Rev/1 | -0.64 |
| 1/2 | 1.53 |
| 2/3 | 1.22 |
| 3/4 | 1.26 |
| 4/5 | 1.23 |
| 5/6 | 1.06 |
| 6/7 | 1.45 |
| 7/8 | 1.35 |

Sample Design: $\dfrac{N_{R_1}}{N_{S_1}} = 2.88$, $\dfrac{N_{R_2}}{N_{S_2}} = 2.09$, $\dfrac{N_{R_3}}{N_{S_3}} = 2.23$ (X = engaged clutch)

|         | Ratios | 650 | 652 | 654 | 656 | 657 | 658 | 659 |
|---------|--------|-----|-----|-----|-----|-----|-----|-----|
| Reverse | -2.88  | X   |     |     | X   |     |     |     |
| Neutral | 0.00   | X   |     |     |     |     |     |     |
| 1       | 4.48   | X   |     | X   |     |     |     |     |
| 2       | 3.09   | X   |     |     |     |     |     | X   |
| 3       | 2.92   |     | X   | X   |     |     |     |     |
| 4       | 2.39   |     |     | X   |     |     | X   |     |
| 5       | 1.90   |     |     | X   | X   |     |     |     |
| 6       | 1.54   |     | X   |     |     |     |     | X   |
| 7       | 1.45   |     |     | X   |     | X   |     |     |
| 8       | 1.00   |     |     |     |     | X   | X   |     |
| 9       | 0.74   |     | X   |     |     | X   |     |     |

| Ratio Spread | 6.05 |
|---|---|
| Ratio Steps | |
| Rev/1 | -0.64 |
| 1/2 | 1.53 |
| 2/3 | 1.22 |
| 3/4 | 1.26 |
| 4/5 | 1.31 |
| 5/6 | 1.45 |
| 6/7 | 1.35 |

| Ratio Spread | 6.05 |
|---|---|
| Ratio Steps | |
| Rev/1 | -0.64 |
| 1/2 | 1.53 |
| 2/3 | 1.22 |
| 3/4 | 1.26 |
| 4/5 | 1.23 |
| 5/6 | 1.06 |
| 6/7 | 1.45 |
| 7/8 | 1.35 |

WIDE RATIO TRANSMISSIONS HAVING MULTIPLE GEAR RATIOS

TECHNICAL FIELD

The present invention relates to a family of power transmissions having three planetary gear sets that are controlled by seven torque-transmitting devices to provide at least seven forward speed ratios and at least one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

It is an object of the present invention to provide an improved family of transmissions having three planetary gear sets controlled to provide at least seven forward speed ratios and at least one reverse speed ratio.

The electrically variable transmission family of the present invention has three planetary gear sets, each of which includes a first, second and third member, which members may comprise a sun gear, a ring gear, or a planet carrier assembly member, in any order.

In referring to the first, second and third gear sets in this description and in the claims, these sets may be counted "first" to "third" in any order in the drawings (i.e., left to right, right to left, etc.). Additionally, the first, second or third members of each gear set may be counted "first" to "third" in any order in the drawings (i.e., top to bottom, bottom to top, etc.) for each gear set.

Each carrier member can be either a single-pinion carrier member (simple) or a double-pinion carrier member (compound).

A first interconnecting member continuously connects the first member of the first planetary gear set with the first member of the second planetary gear set.

A second interconnecting member continuously connects the second member of the second planetary gear set with the first member of the third planetary gear set.

A third interconnecting member continuously connects the second member of the first planetary gear set with the second member of the third planetary gear set.

The input member is continuously connected with at least one member of the planetary gear sets. The output member is continuously connected with at least one member of the planetary gear sets.

A first torque transmitting device, such a brake, selectively connects the first interconnecting member with a stationary member (transmission housing/casing).

A second torque transmitting device, such as a brake, selectively connects a member of the first planetary gear set with a stationary member (transmission housing/casing).

A third torque transmitting device, such as a brake, selectively connects a member of the third planetary gear set with a stationary member (transmission housing/casing).

A fourth torque transmitting device, such as a clutch, selectively connects a member of the first planetary gear set with the member of the first, second or third planetary gear set which is continuously connected with the input member.

A fifth torque transmitting device, such as a clutch, selectively connects the first or second interconnecting member with the member of the first, second or third planetary gear set which is continuously connected with the input member.

A sixth torque transmitting device, such as a clutch, selectively connects a member of the first or third planetary gear set with the first, second or third interconnecting member.

An optional seventh torque transmitting device, such as a clutch, selectively connects a member of the third planetary gear set with the third interconnecting member.

The six or seven torque-transmitting mechanisms are selectively engageable in combinations of two to yield at least seven forward speed ratios and at least one reverse speed ratio.

A variety of speed ratios and ratio spreads can be realized by suitably selecting the tooth ratios of the planetary gear sets.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission in accordance with the present invention;

FIG. 1b is a truth table and chart depicting some of the operating characteristics of the powertrain shown in FIG. 1a;

FIG. 2a is a schematic representation of a powertrain including a planetary transmission incorporating another family member of the present invention;

FIG. 2b is an operating mode table and fixed ratio mode table depicting some of the operating characteristics of the powertrain shown in FIG. 2a;

FIG. 3a is a schematic representation of a powertrain including a planetary transmission incorporating another family member of the present invention;

FIG. 3b is an operating mode table and fixed ratio mode table depicting some of the operating characteristics of the powertrain shown in FIG. 3a;

FIG. 4a is a schematic representation of a powertrain including a planetary transmission incorporating another family member of the present invention;

FIG. 4b is an operating mode table and fixed ratio mode table depicting some of the operating characteristics of the powertrain shown in FIG. 4a;

FIG. 5a is a schematic representation of a powertrain including a planetary transmission incorporating another family member of the present invention;

FIG. 5b is an operating mode table and fixed ratio mode table depicting some of the operating characteristics of the powertrain shown in FIG. 5a;

FIG. 6a is a schematic representation of a powertrain including a planetary transmission incorporating another family member of the present invention;

FIG. 6b is an operating mode table and fixed ratio mode table depicting some of the operating characteristics of the powertrain shown in FIG. 6a;

FIG. 7a is a schematic representation of a including a planetary transmission incorporating another family member of the present invention; and FIG. 7b is an operating mode table and fixed ratio mode table depicting some of the operating characteristics of the powertrain shown in FIG. 7a.

DESCRIPTION OF THE PREFERRED EMBODIMENTS

Figure 1B:
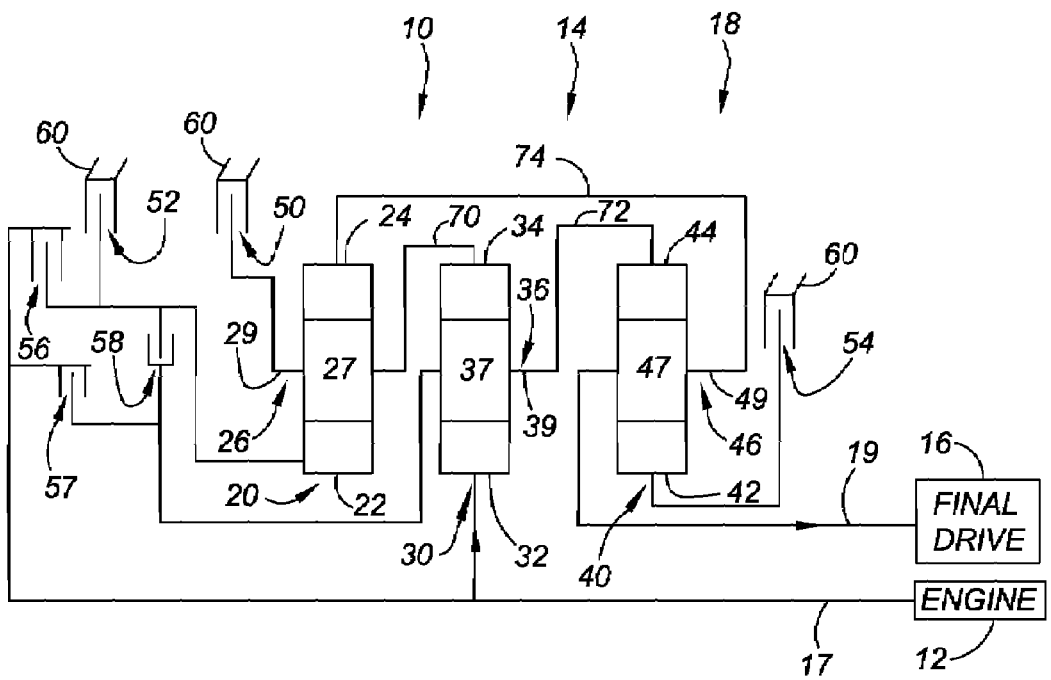

Referring to the drawings, there is shown in FIG. 1a a powertrain 10 having a conventional engine and torque converter 12, a planetary transmission 14, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 14 includes an input member 17 continuously connected with the engine 12, a planetary gear arrangement 18, and an output member 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the ring gear member 34 and the sun gear member 32.

The planetary gear set 40 includes a sun gear member 42, a ring gear member 44, and a planet carrier assembly member 46. The planet carrier assembly member 46 includes a plurality of pinion gears 47 mounted on a carrier member 49 and disposed in meshing relationship with both the ring gear member 44 and the sun gear member 42.

The planetary gear arrangement also includes six torque-transmitting mechanisms 50, 52, 54, 56, 57 and 58. The torque-transmitting mechanisms 50, 52 and 54 are stationary-type torque-transmitting mechanisms, commonly termed brakes or reaction clutches. The torque-transmitting mechanisms 56, 57 and 58 are rotating-type torque-transmitting mechanisms, commonly termed clutches.

The input member 17 is continuously connected to the sun gear member 32 of the planetary gear set 30. The output member 19 is continuously connected with the carrier member 46 of the planetary gear set 40. The first interconnecting member 70 continuously connects the carrier member 26 of the planetary gear set 20 with the ring gear member 34 of the planetary gear set 30. The second interconnecting member 72 continuously connects the carrier member 36 of the planetary gear set 30 with the ring gear member 44 of the planetary gear set 40. The third interconnecting member 74 continuously connects the ring gear member 24 of the planetary gear set 20 with the carrier member 46 of the planetary gear set 40.

A first torque transmitting device, such as brake 50, selectively connects the carrier member 26 of the planetary gear set 20 and ring gear member 34 of the planetary gear set 30 via interconnecting member 70 with the transmission housing 60. A second torque transmitting device, such as brake 52, selectively connects the sun gear member 22 of the planetary gear set 20 with the transmission housing 60. A third torque transmitting device, such as brake 54, selectively connects the sun gear member 42 of the planetary gear set 40 with the transmission housing 60. A fourth torque transmitting device, such as clutch 56, selectively connects the sun gear member 22 of the planetary gear set 20 with the sun gear member 32 of the planetary gear set 30 which is continuously connected with the input member 17. A fifth torque transmitting device, such as clutch 57, selectively connects the carrier member 36 of the planetary gear set 30 and the ring gear member 44 of the planetary gear set 40 with the sun gear member 32 of the planetary gear set 30 which is continuously connected with the input member 17. A sixth torque transmitting device, such as clutch 58, selectively connects the carrier member 36 of the planetary gear set 30 and the ring gear member 44 of the planetary gear set 40 with the sun gear member 22 of the planetary gear set 20.

As shown in FIG. 1b, and in particular the truth table disclosed therein, the torque-transmitting mechanisms are selectively engaged in combinations of two to provide at least seven forward speed ratios and at least one reverse speed ratio.

The reverse (Reverse) speed ratio is established with the engagement of the brake 50 and the clutch 56. The brake 50 engages the ring gear member 34 and the carrier member 26 via interconnecting member 70 with the transmission housing 60. The clutch 56 engages the sun gear member 22 with the sun gear member 32 which is continuously connected with the input member 17. The sun gear member 22 and sun gear member 32 rotate at the same speed as the input member 17. The carrier member 26 and the ring gear member 34 do not rotate. The carrier member 36 and ring gear member 44 rotate at the same speed. The speed of the carrier member 36 is determined from the speed of the sun gear member 32 and the ring gear/sun gear tooth ratio of the planetary gear set 30. The ring gear member 24, carrier member 46 and output member 19 rotate at the same speed. The speed of the ring gear member 24, and therefore the output member 19, is determined from the speed of the sun gear member 22 and the ring gear/sun gear tooth ratio of the planetary gear set 20. The numerical value of the reverse speed ratio is determined utilizing the ring gear/sun gear tooth ratios of the planetary gear sets 20 and 30.

The first forward speed ratio is established with the engagement of the brakes 50 and 54. The brake 50 engages the carrier member 26 and the ring gear member 34 with the transmission housing 60. The brake 54 engages the sun gear member 42 with the transmission housing 60. The sun gear member 32 rotates at the same speed as the input member 17. The ring gear member 34 and carrier member 26 do not rotate. The ring gear member 44 and carrier member 36 rotate at the same speed. The speed of the carrier member 36 is determined from the speed of the sun gear member 32 and the ring gear/sun gear tooth ratio of the planetary gear set 30. The sun gear member 42 does not rotate. The ring gear member 24, carrier member 46 and output member 19 rotate at the same speed. The speed of the carrier member 46, and therefore the output member 19, is determined from the speed of the ring gear member 44 and the ring gear/sun gear tooth ratio of the planetary gear set 40. The numerical value of the first forward speed ratio is determined utilizing the ring gear/sun gear tooth ratios of the planetary gear sets 30 and 40.

The second forward speed ratio is established with the engagement of the brakes 52 and 54. The brake 52 engages the sun gear member 22 with the transmission housing 60. The brake 54 engages the sun gear member 42 with the transmission housing 60. The sun gear member 32 rotates at the same speed as the input member 17. The ring gear member 34 and carrier member 26 rotate at the same speed. The ring gear member 44 and carrier member 36 rotate at the same speed. The speed of the carrier member 36 is determined from the speed of the sun gear member 32, the speed of the ring gear member 34 and the ring gear/sun gear tooth ratio of the planetary gear set 30. The sun gear member 22 does not rotate. The ring gear member 24, carrier member 46 and output member 19 rotate at the same speed. The speed of the carrier member 26 is determined from the speed of the ring gear member 24 and the ring gear/sun gear tooth ratio of the planetary gear set 20. The sun gear member 42 does not rotate. The speed of the carrier member 46, and therefore the output member 19, is determined from the speed of the ring gear member 44 and the ring gear/sun gear tooth ratio of the planetary gear set 40. The numerical value of the second forward speed ratio is determined utilizing the ring gear/sun gear tooth ratios of the planetary gear sets 20, 30 and 40.

The third forward speed ratio is established with the engagement of the brake 54 and the clutch 58. The brake 54 engages the sun gear member 42 with the transmission housing 60. The clutch 58 engages the sun gear member 22 with the carrier member 36. The sun gear member 32 rotates at the same speed as the input member 17. The ring gear member 44, carrier member 36 and sun gear member 22 rotate at the same speed. The ring gear member 34 and carrier member 26 rotate at the same speed. The speed of the ring gear member 34 is determined from the speed of the sun gear member 32, the speed of the carrier member 36 and the ring gear/sun gear tooth ratio of the planetary gear set 30. The ring gear member 24, carrier member 46 and output member 19 rotate at the same speed. The speed of the sun gear member 22 is determined from the speed of the ring gear member 24, the speed of the carrier member 26 and the ring gear/sun gear tooth ratio of the planetary gear set 20. The sun gear member 42 does not rotate. The speed of the carrier member 46, and therefore the output member 19, is determined from the speed of the ring gear member 44 and the ring gear/sun gear tooth ratio of the planetary gear set 40. The numerical value of the third forward speed ratio is determined utilizing the ring gear/sun gear tooth ratios of the planetary gear sets 20, 30 and 40.

The fourth forward speed ratio is established with the engagement of the brake 54 and the clutch 56. The brake 54 engages the sun gear member 42 with the transmission housing 60. The clutch 56 engages the sun gear member 22 with the sun gear member 32 which is continuously connected with the input member 17. The sun gear member 32 and sun gear member 22 rotate at the same speed as the input member 17. The carrier member 36 and ring gear member 44 rotate at the same speed. The ring gear member 34 and carrier member 26 rotate at the same speed. The speed of the ring gear member 34 is determined from the speed of the sun gear member 32, the speed of the carrier member 36 and the ring gear/sun gear tooth ratio of the planetary gear set 30. The ring gear member 24, carrier member 46 and output member 19 rotate at the same speed. The speed of the carrier member 26 is determined from the speed of the sun gear member 22, the speed of the ring gear member 24 and the ring gear/sun gear tooth ratio of the planetary gear set 20. The sun gear member 42 does not rotate. The speed of the carrier member 46, and therefore the output member 19, is determined from the speed of the ring gear member 44 and the ring gear/sun gear tooth ratio of the planetary gear set 40. The numerical value of the fourth forward speed ratio is determined utilizing the ring gear/sun gear tooth ratio of the planetary gear sets 20, 30 and 40.

The fifth forward speed ratio is established with the engagement of the brake 54 and the clutch 57. The brake 54 engages the sun gear member 42 with the transmission housing 60. The clutch 57 engages the ring gear member 44 and carrier member 36 via interconnecting member 70 with the sun gear member 32 which is continuously connected with the input member 17. The ring gear member 44, carrier member 26 and planetary gear set 30 rotate at the same speed as the input member 17. As is well know by those skilled in the art, wherever any two member of a planetary gear set rotate at the same speed, the entire planetary gear set rotates at the same speed. The sun gear member 42 does not rotate. The carrier member 46, ring gear member 24 and output member 19 rotate at the same speed. The speed of the carrier member 46, and therefore the output member 19, is determined from the speed of the ring gear member 44 and the ring gear/sun gear tooth ratio of the planetary gear set 40. The numerical value of the fifth forward speed ratio is determined utilizing the ring gear/sun gear tooth ratio of the planetary gear set 40.

The sixth forward speed ratio is established with the engagement of the clutches 57 and 58. In this configuration, the input member 17 is directly connected with the output member 19. The numerical value of the ninth forward speed ratio is 1.

The seventh forward speed ratio is established with the engagement of the brake 52 and the clutch 57. The brake 52 engages the sun gear member 22 with the transmission housing 60. The clutch 57 engages the ring gear member 44 and carrier member 36 with the sun gear member 32 which is continuously connected with the input member 17. The ring gear member 44, the carrier member 26 and the planetary gear set 30 rotate at the same speed as the input member 17. The sun gear member 22 does not rotate. The ring gear member 24, carrier member 46 and output member 19 rotate at the same speed. The speed of the ring gear member 24, and therefore the output member 19, is determined from the speed of the carrier member 26 and the ring gear/sun gear tooth ratio of the planetary gear set 20. The numerical value of the seventh forward speed ratio is determined utilizing the ring gear/sun gear tooth ratios of the planetary gear set 20.

As set forth above, the engagement schedule for the torque-transmitting mechanisms is shown in the truth table of FIG. 1b. This truth table also provides an example of speed ratios that are available utilizing the ring gear/sun gear tooth ratios given by way of example in FIG. 1b. The $N_{R1}/S_{R1}$ value is the tooth ratio of the planetary gear set 20; the $N_{R2}/S_{R2}$ value is the tooth ratio of the planetary gear set 30; and the $N_{R3}/S_{R3}$ value is the tooth ratio of the planetary gear set 40. Also, the chart of FIG. 1b describes the ratio steps that are attained utilizing the sample of tooth ratios given for the engagement schedules of the above described transmission. For example, the step ratio between the first and second forward speed ratios is 1.60, while the step ratio between the reverse speed ratio (Reverse) and first forward ratio is −0.60.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

Description of a Second Exemplary Embodiment

With reference to FIG. 2a, a powertrain 110 is shown, including a conventional engine and torque converter 12 connected to another embodiment of the planetary transmission, designated generally by the numeral 114, and a conventional final drive mechanism 16.

The planetary transmission 114 includes an input member 17 continuously connected with the engine 112, a planetary gear arrangement 118, and an output member 19 continuously connected with the final drive mechanism 16. The planetary gear arrangement 118 includes three planetary gear sets 120, 130 and 140.

The planetary gear set 120 includes a sun gear member 122, a ring gear member 124, and a planet carrier assembly member 126. The planet carrier assembly member 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the ring gear member 134 and the sun gear member 132.

The planetary gear set 140 includes a sun gear member 142, a ring gear member 144, and a planet carrier assembly member 146. The planet carrier assembly member 146 includes a plurality of pinion gears 147 mounted on a carrier member 149 and disposed in meshing relationship with both the ring gear member 144 and the sun gear member 142.

The planetary gear arrangement also includes six torque-transmitting mechanisms 150, 152, 154, 156, 157 and 158. The torque-transmitting mechanisms 150, 152 and 154 are stationary-type torque-transmitting mechanisms, commonly termed brakes or reaction clutches. The torque-transmitting mechanisms 156, 157 and 158 are rotating-type torque-transmitting mechanisms, commonly termed clutches.

The input member 17 is continuously connected to the sun gear member 132 of the planetary gear set 130. The output member 19 is continuously connected with the carrier member 146 of the planetary gear set 140. The first interconnecting member 170 continuously connects the carrier member 126 with the ring gear member 136. The second interconnecting member 172 continuously connects the carrier member 136 with the ring gear member 144. The third interconnecting member 174 continuously connects the ring gear member 124 with the carrier member 146.

A first torque transmitting device, such as brake 150, selectively connects the ring gear member 134 and the carrier member 126 via interconnecting member 170 with the transmission housing 160. A second torque transmitting device, such as brake 152, selectively connects the sun gear member 122 with the transmission housing 160. A third torque transmitting device, such as brake 154, selectively connects the sun gear member 142 with the transmission housing 160. A fourth torque transmitting device, such as clutch 156, selectively connects the sun gear member 122 with the sun gear member 132 which is continuously connected with the input member 17. A fifth torque transmitting device, such as clutch 157, selectively connects the ring gear member 144 and the carrier member 136 via interconnecting member 172 with the sun gear member 132 which is continuously connected with the input member 17. A sixth torque transmitting device, such as clutch 158, selectively connects the sun gear member 122 with the ring gear member 144 and the carrier member 136 via interconnecting member 172.

The truth tables given in FIGS. 2b, 3b, 4b, 5b, 6b and 7b show the engagement sequences for the torque-transmitting mechanisms to provide at least seven forward speed ratios and at least one reverse ratio. As shown and described above for the configuration in FIG. 1a, those skilled in the art will understand from the respective truth tables how the speed ratios are established through the planetary gear sets identified in the written description.

Figure 2B:
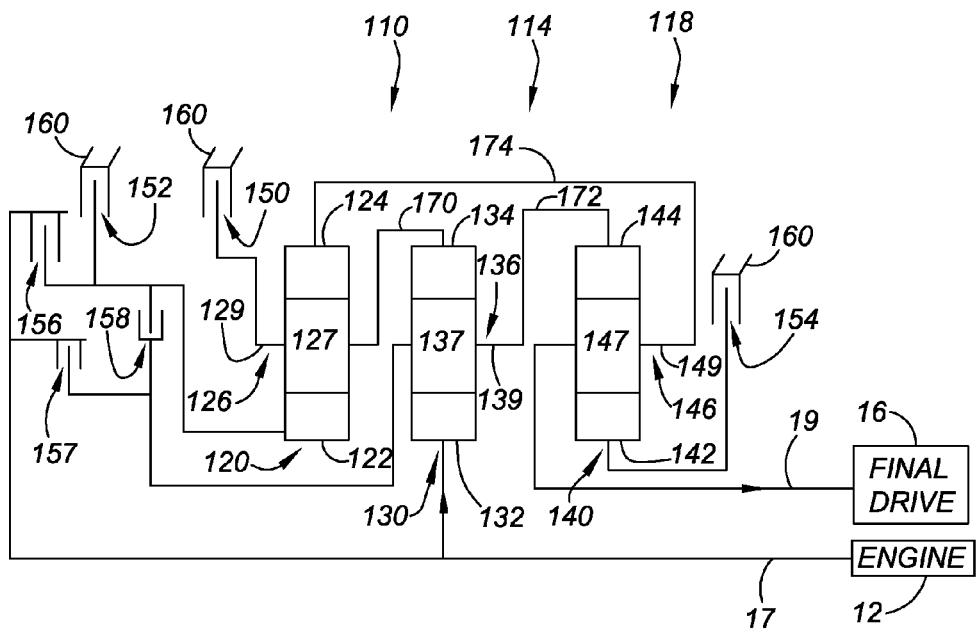

As set forth above, the truth table of FIG. 2b describes the engagement sequence of the torque-transmitting mechanisms utilized to provide one reverse drive ratio and at least seven forward speed ratios. The truth table also provides an example of the ratios that can be attained with the family members shown in FIG. 2a utilizing the sample tooth ratios given in FIG. 2b. The $N_{R1}/N_{S1}$ value is the tooth ratio of the planetary gear set 120; the $N_{R2}/N_{S2}$ value is the tooth ratio of the planetary gear set 130; and the $N_{R3}/N_{S3}$ value is the tooth ratio of the planetary gear set 140. Also shown in FIG. 2b are the ratio steps between single step ratios in the forward direction as well as the reverse to first ratio step ratio for the engagement schedules. For example, the first to second step ratio is 1.52.

Description of a Third Exemplary Embodiment

Figures 3A, 3B:
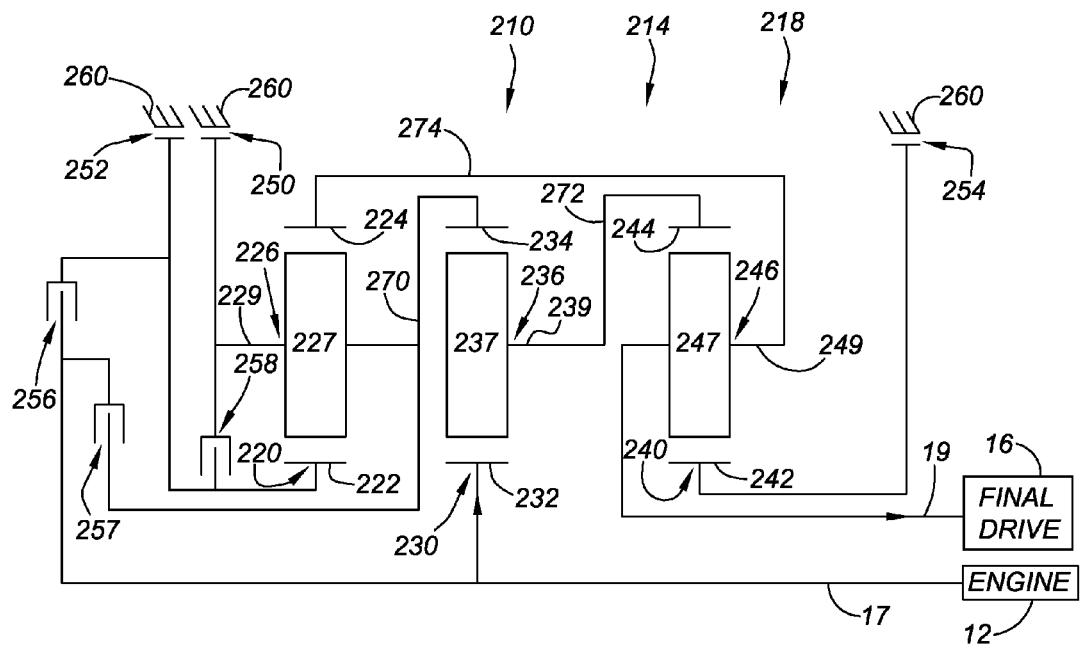

With reference to FIG. 3a, a powertrain 210 is shown, including a conventional engine and torque converter 12 connected to another embodiment of the planetary transmission, designated generally by the numeral 214, and a conventional final drive mechanism 16.

The planetary transmission 214 includes an input member 17 continuously connected with the engine 212, a planetary gear arrangement 218, and an output member 19 continuously connected with the final drive mechanism 16. The planetary gear arrangement 218 includes three planetary gear sets 220, 230 and 240.

The planetary gear set 220 includes a sun gear member 222, a ring gear member 224, and a planet carrier assembly member 226. The planet carrier assembly member 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the ring gear member 234 and the sun gear member 232.

The planetary gear set 240 includes a sun gear member 242, a ring gear member 144, and a planet carrier assembly member 246. The planet carrier assembly member 246 includes a plurality of pinion gears 247 mounted on a carrier member 249 and disposed in meshing relationship with both the ring gear member 244 and the sun gear member 242.

The planetary gear arrangement also includes six torque-transmitting mechanisms 250, 252, 254, 256, 257 and 258. The torque-transmitting mechanisms 250, 252 and 254 are stationary-type torque-transmitting mechanisms, commonly termed brakes or reaction clutches. The torque-transmitting mechanisms 256, 257 and 258 are rotating-type torque-transmitting mechanisms, commonly termed clutches.

The input member 17 is continuously connected to the sun gear member 232 of the planetary gear set 230. The output member 19 is continuously connected with the carrier member 246 of the planetary gear set 240. The first interconnecting member 270 continuously connects the carrier member 226 with the ring gear member 234. The second interconnecting member 272 continuously connects the carrier member 236 with the ring gear member 244. The third interconnecting member 274 continuously connects the ring gear member 224 with the carrier member 246.

A first torque transmitting device, such as brake 250, selectively connects the carrier member 226 and ring gear member 234 via interconnecting member 270 with the transmission housing 260. A second torque transmitting device, such as brake 252, selectively connects the sun gear member 222 with the transmission housing 260. A third torque transmitting device, such as brake 254, selectively connects the sun gear member 242 with the transmission housing 260. A fourth torque transmitting device, such as clutch 256, selectively connects the sun gear member 222 with the sun gear member 232 which is continuously connected with the input member 17. A fifth torque transmitting device, such as clutch 257, selectively connects the carrier member 226 and ring gear member 234 via interconnecting member 270 with the sun gear member 232 which is continuously connected with the input member 17. A sixth torque transmitting device, such as clutch 258, selectively connects the carrier member 226 and ring gear member 234 via interconnecting member 270 with the sun gear member 222.

As set forth above, the truth table of FIG. 3b describes the engagement sequence of the torque-transmitting mechanisms utilized to provide one reverse drive ratio and at least seven forward speed ratios. The truth table also provides an example of the ratios that can be attained with the family members shown in FIG. 3a utilizing the sample tooth ratios given in FIG. 3b. The $N_{R1}/N_{S1}$ value is the tooth ratio of the planetary gear set 220; the $N_{R2}/N_{S2}$ value is the tooth ratio of the planetary gear set 230; and the $N_{R3}/N_{S3}$ value is the tooth ratio of the planetary gear set 240. Also shown in FIG. 3b are the ratio steps between single step ratios in the forward direction as well as the reverse to first ratio step ratio for the engagement schedules. For example, the first to second step ratio is 1.53.

Description of a Fourth Exemplary Embodiment

Figures 4A, 4B:
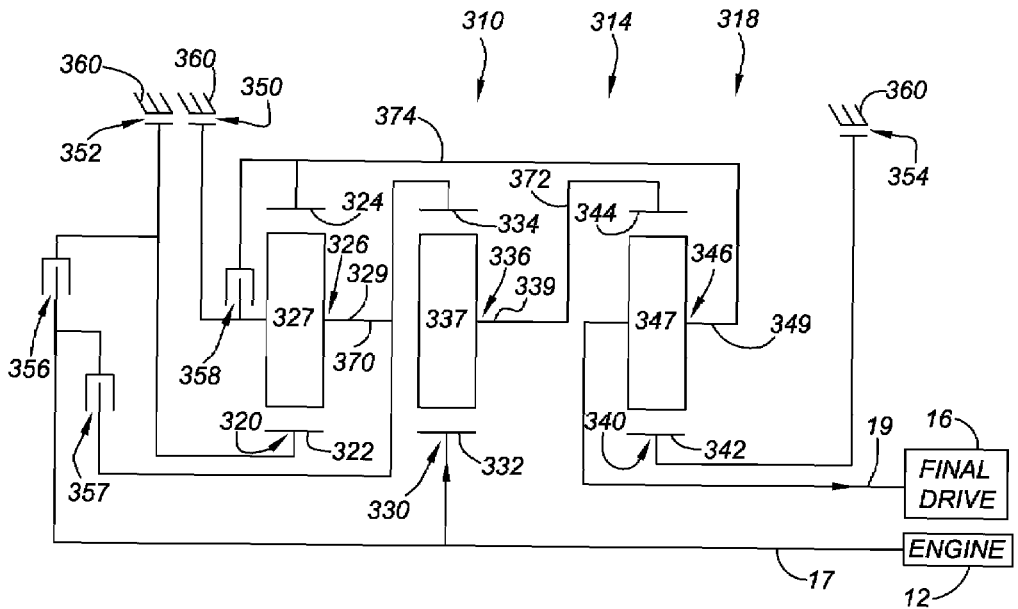

With reference to FIG. 4a, a powertrain 310 is shown, including a conventional engine and torque converter 12 connected to another embodiment of the planetary transmission, designated generally by the numeral 314, and a conventional final drive mechanism 16.

The planetary transmission 314 includes an input member 17 continuously connected with the engine 312, a planetary gear arrangement 318, and an output member 19 continuously connected with the final drive mechanism 16. The planetary gear arrangement 318 includes three planetary gear sets 320, 330 and 340.

The planetary gear set 320 includes a sun gear member 322, a ring gear member 324, and a planet carrier assembly member 326. The planet carrier assembly member 326 includes a plurality of pinion gears 327 rotatably mounted on a carrier member 229 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the ring gear member 334 and the sun gear member 332.

The planetary gear set 340 includes a sun gear member 342, a ring gear member 344, and a planet carrier assembly member 346. The planet carrier assembly member 346 includes a plurality of pinion gears 347 mounted on a carrier member 349 and disposed in meshing relationship with both the ring gear member 344 and the sun gear member 342.

The planetary gear arrangement also includes six torque-transmitting mechanisms 350, 352, 354, 356, 357 and 358. The torque-transmitting mechanisms 350, 352 and 354 are stationary-type torque-transmitting mechanisms, commonly termed brakes or reaction clutches. The torque-transmitting mechanisms 356, 357 and 358 are rotating-type torque-transmitting mechanisms, commonly termed clutches.

The input member 17 is continuously connected to the sun gear member 332 of the planetary gear set 330. The output member 19 is continuously connected with the carrier member 346 of the planetary gear set 340. The first interconnecting member 370 continuously connects the carrier member 326 with the ring gear member 334. The second interconnecting member 372 continuously connects the carrier member 336 with the ring gear member 344. The third interconnecting member 374 continuously connects the ring gear member 324 with the carrier member 346.

A first torque transmitting device, such as brake 350, selectively connects the carrier member 326 and ring gear member 334 via interconnecting member 370 with the transmission housing 360. A second torque transmitting device, such as brake 352, selectively connects the sun gear member 322 with the transmission housing 360. A third torque transmitting device, such as brake 354, selectively connects the sun gear member 342 with the transmission housing 360. A fourth torque transmitting device, such as clutch 356, selectively connects the sun gear member 322 with the sun gear member 332 which is continuously connected with the input member 17. A fifth torque transmitting device, such as clutch 357, selectively connects the carrier member 326 and ring gear member 334 with the sun gear member 332 which is continuously connected with the input member 17. A sixth torque transmitting device, such as clutch 358, selectively connects the ring gear member 324 and carrier member 346 via interconnecting member 374 with the carrier member 326 and ring gear member 334 via interconnecting member 370.

As set forth above, the truth table of FIG. 4b describes the engagement sequence of the torque-transmitting mechanisms utilized to provide one reverse drive ratio and at least seven forward speed ratios. The truth table also provides an example of the ratios that can be attained with the family members shown in FIG. 4a utilizing the sample tooth ratios given in FIG. 4b. The $N_{R1}/N_{S1}$ value is the tooth ratio of the planetary gear set 320; the $N_{R2}/N_{S2}$ value is the tooth ratio of the planetary gear set 330; and the $N_{R3}/N_{S3}$ value is the tooth ratio of the planetary gear set 340. Also shown in FIG. 4b are the ratio steps between single step ratios in the forward direction as well as the reverse to first ratio step ratio for the engagement schedules. For example, the first to second step ratio is 1.68.

Description of a Fifth Exemplary Embodiment

Figures 5A, 5B:
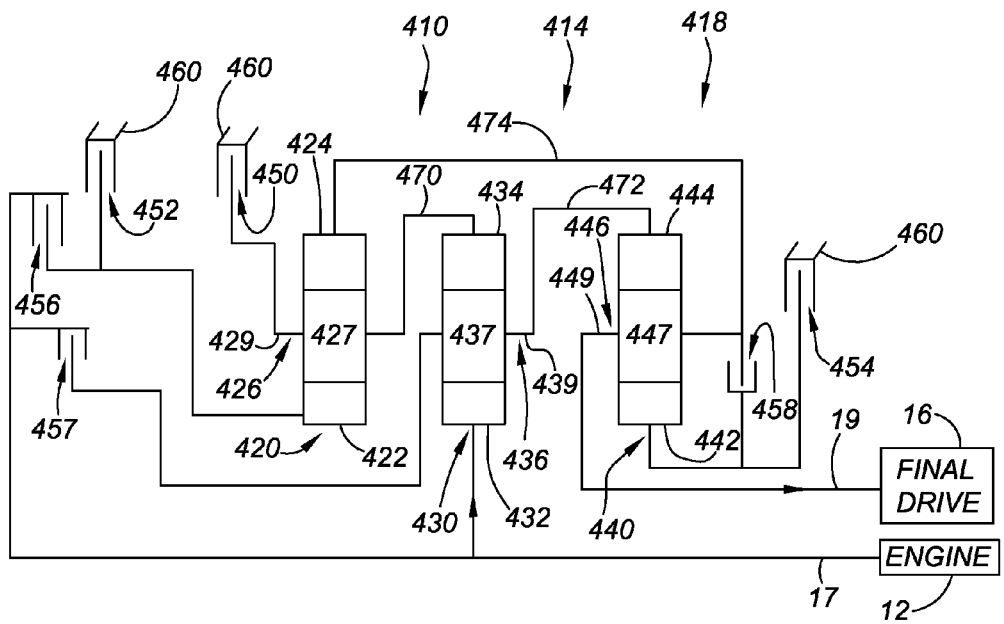

With reference to FIG. 5a, a powertrain 410 is shown, including a conventional engine and torque converter 12 connected to another embodiment of the planetary transmission, designated generally by the numeral 414, and a conventional final drive mechanism 16.

The planetary transmission 414 includes an input member 17 continuously connected with the engine 412, a planetary gear arrangement 418, and an output member 19 continuously connected with the final drive mechanism 16. The planetary gear arrangement 418 includes three planetary gear sets 420, 430 and 440.

The planetary gear set 420 includes a sun gear member 422, a ring gear member 424, and a planet carrier assembly member 426. The planet carrier assembly member 426 includes a plurality of pinion gears 427 rotatably mounted on a carrier member 429 and disposed in meshing relationship with both the sun gear member 422 and the ring gear member 424.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the ring gear member 434 and the sun gear member 432.

The planetary gear set 440 includes a sun gear member 442, a ring gear member 444, and a planet carrier assembly member 446. The planet carrier assembly member 446 includes a plurality of pinion gears 447 mounted on a carrier member 449 and disposed in meshing relationship with both the ring gear member 444 and the sun gear member 442.

The planetary gear arrangement also includes six torque-transmitting mechanisms 450, 452, 454, 456, 457 and 458. The torque-transmitting mechanisms 450, 452 and 454 are stationary-type torque-transmitting mechanisms, commonly termed brakes or reaction clutches. The torque-transmitting mechanisms 456, 457 and 458 are rotating-type torque-transmitting mechanisms, commonly termed clutches.

The input member 17 is continuously connected to the sun gear member 432 of the planetary gear set 430. The output member 19 is continuously connected with the carrier member 446 of the planetary gear set 440. The first interconnecting member 470 continuously connects the carrier member 426 with the ring gear member 434. The second interconnecting member 472 continuously connects the carrier member 436 with the ring gear member 444. The third interconnecting member 474 continuously connects the ring gear member 424 with the carrier member 446.

A first torque transmitting device, such as brake 450, selectively connects the carrier member 426 and ring gear member 434 via interconnecting member 470 with the transmission housing 460. A second torque transmitting device, such as brake 452, selectively connects the sun gear member 422 with the transmission housing 460. A third torque transmitting device, such as brake 454, selectively connects the sun gear member 442 with the transmission housing 460. A fourth torque transmitting device, such as clutch 456, selectively connects the sun gear member 422 with the sun gear member 432 which is continuously connected with the input member 17. A fifth torque transmitting device, such as clutch 457, selectively connects the carrier member 436 and ring gear member 444 via interconnecting member 470 with the sun gear member 432 which is continuously connected with the input member 17. A sixth torque transmitting device, such as clutch 458, selectively connects the carrier member 446 and ring gear member 424 via interconnecting member 474 with the sun gear member 442.

As set forth above, the truth table of FIG. 5b describes the engagement sequence of the torque-transmitting mechanisms utilized to provide one reverse drive ratio and at least seven forward speed ratios. The truth table also provides an example of the ratios that can be attained with the family members shown in FIG. 5a utilizing the sample tooth ratios given in FIG. 5b. The $N_{R1}/N_{S1}$ value is the tooth ratio of the planetary gear set 420; the $N_{R2}/N_{S2}$ value is the tooth ratio of the planetary gear set 430; and the $N_{R3}/N_{S3}$ value is the tooth ratio of the planetary gear set 440. Also shown in FIG. 5b are the ratio steps between single step ratios in the forward direction as well as the reverse to first ratio step ratio for the engagement schedules. For example, the first to second step ratio is 1.43.

Description of a Sixth Exemplary Embodiment

Figures 6A, 6B:
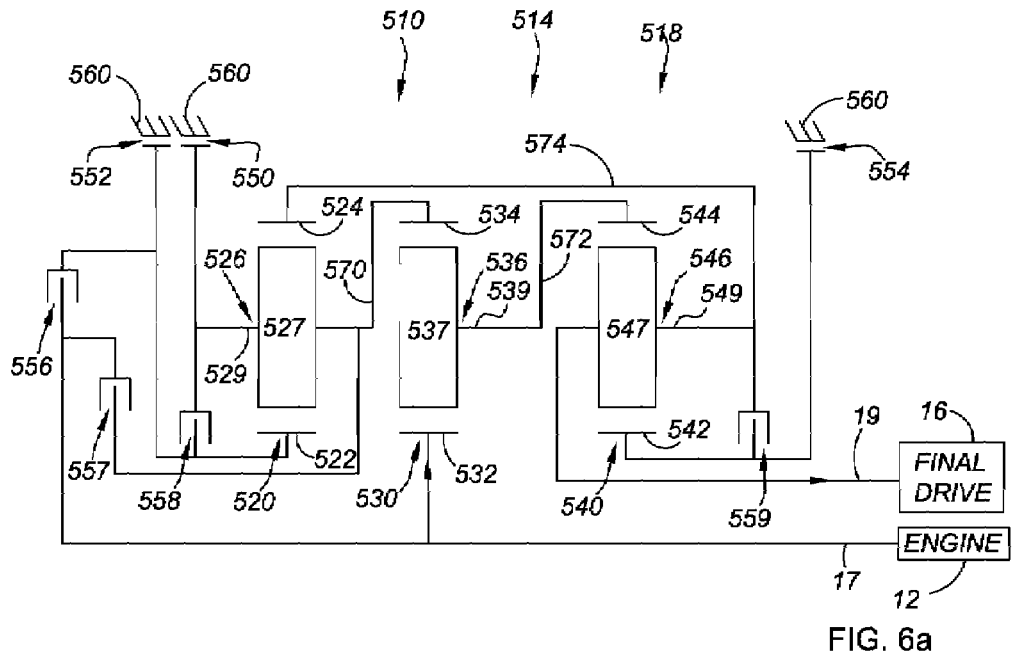

With reference to FIG. 6a, a powertrain 510 is shown, including a conventional engine and torque converter 12 connected to another embodiment of the planetary transmission, designated generally by the numeral 514, and a conventional final drive mechanism 16.

The planetary transmission 514 includes an input member 17 continuously connected with the engine 512, a planetary gear arrangement 518, and an output member 19 continuously connected with the final drive mechanism 16. The planetary gear arrangement 518 includes three planetary gear sets 520, 530 and 540.

The planetary gear set 520 includes a sun gear member 522, a ring gear member 524, and a planet carrier assembly member 526. The planet carrier assembly member 5226 includes a plurality of pinion gears 527 rotatably mounted on a carrier member 529 and disposed in meshing relationship with both the sun gear member 522 and the ring gear member 524.

The planetary gear set 530 includes a sun gear member 532, a ring gear member 534, and a planet carrier assembly member 536. The planet carrier assembly member 536 includes a plurality of pinion gears 537 rotatably mounted on a carrier member 539 and disposed in meshing relationship with both the ring gear member 534 and the sun gear member 532.

The planetary gear set 540 includes a sun gear member 542, a ring gear member 544, and a planet carrier assembly member 546. The planet carrier assembly member 546 includes a plurality of pinion gears 547 mounted on a carrier member 549 and disposed in meshing relationship with both the ring gear member 544 and the sun gear member 542.

The planetary gear arrangement also includes seven torque-transmitting mechanisms 550, 552, 554, 556, 557, 558 and 559. The torque-transmitting mechanisms 550, 552 and 554 are stationary-type torque-transmitting mechanisms, commonly termed brakes or reaction clutches. The torque-transmitting mechanisms 556, 557, 558 and 559 are rotating-type torque-transmitting mechanisms, commonly termed clutches.

The input member 17 is continuously connected to the sun gear member 532 of the planetary gear set 530. The output member 19 is continuously connected with the carrier member 546 of the planetary gear set 540. The first interconnecting member 570 continuously connects the carrier member 526 with the ring gear member 534. The second interconnecting member 572 continuously connects the carrier member 536 with the ring gear member 544. The third interconnecting member 574 continuously connects the ring gear member 524 with the carrier member 546.

A first torque transmitting device, such as brake 550, selectively connects the carrier member 526 and ring gear member 534 via interconnecting member 570 with the transmission housing 560. A second torque transmitting device, such as brake 552, selectively connects the sun gear member 522 with the transmission housing 560. A third torque transmitting device, such as brake 554, selectively connects the sun gear member 542 with the transmission housing 560. A fourth torque transmitting device, such as clutch 556, selectively connects the sun gear member 522 with the sun gear member 532 which is continuously connected with the input member 17. A fifth torque transmitting device, such as clutch 557, selectively connects the carrier member 526 and ring gear member 534 via interconnecting member 570 with the sun gear member 532 which is continuously connected with the input member 17. A sixth torque transmitting device, such as clutch 558, selectively connects the carrier member 526 and ring gear member 534 via interconnecting member 570 with the sun gear member 522. A seventh torque transmitting device, such as clutch 559, selectively connects ring gear member 524 and carrier member 546 via interconnecting member 574 with the sun gear member 542.

As set forth above, the truth table of FIG. 6b describes the engagement sequence of the torque-transmitting mechanisms utilized to provide one reverse drive ratio and at least seven forward speed ratios. The truth table also provides an example of the ratios that can be attained with the family members shown in FIG. 6a utilizing the sample tooth ratios given in FIG. 6b. The $N_{R1}/N_{S1}$ value is the tooth ratio of the planetary gear set 520; the $N_{R2}/N_{S2}$ value is the tooth ratio of the planetary gear set 530; and the $N_{R3}/N_{S3}$ value is the tooth ratio of the planetary gear set 540. Also shown in FIG. 6b are the ratio steps between single step ratios in the forward direction as well as the reverse to first ratio step ratio for 7-speed and 8-speed engagement schedules. For example, the first to second step ratio is 1.53 for each.

The 8-speed has two double transition shifts, while the 7-speed has all single transition shifts.

Description of a Seventh Exemplary Embodiment

Figures 7A, 7B:
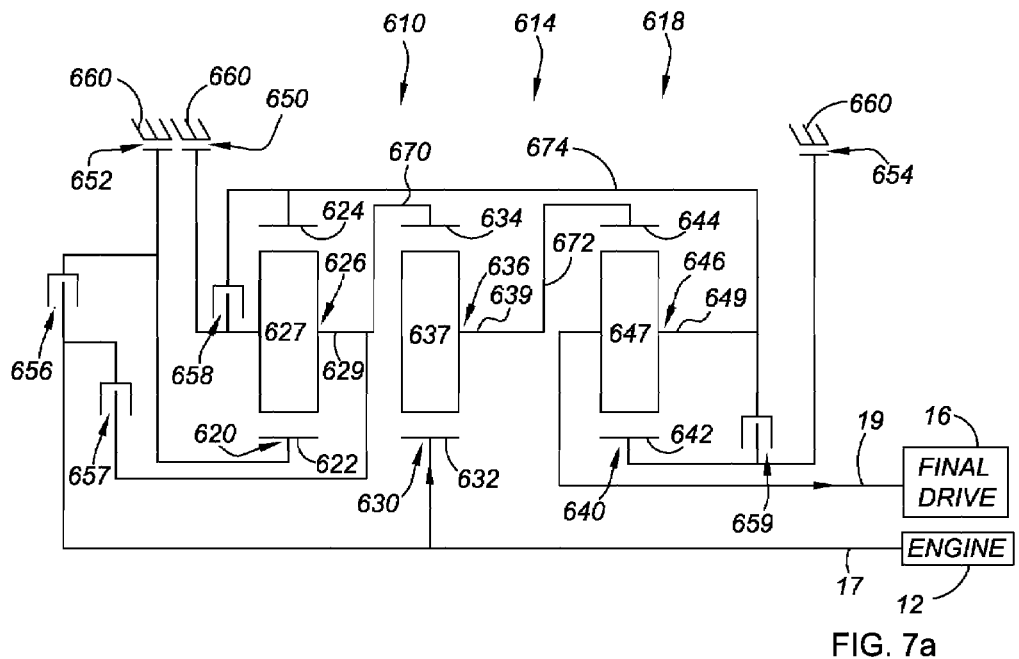

With reference to FIG. 7a, a powertrain 610 is shown, including a conventional engine and torque converter 12 connected to another embodiment of the planetary transmission, designated generally by the numeral 614, and a conventional final drive mechanism 16.

The planetary transmission 614 includes an input member 17 continuously connected with the engine 612, a planetary gear arrangement 618, and an output member 19 continuously connected with the final drive mechanism 16. The planetary gear arrangement 618 includes three planetary gear sets 620, 630 and 640.

The planetary gear set 620 includes a sun gear member 622, a ring gear member 624, and a planet carrier assembly member 626. The planet carrier assembly member 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of pinion gears 637 rotatably mounted on a carrier member 639 and disposed in meshing relationship with both the ring gear member 634 and the sun gear member 634.

The planetary gear set 640 includes a sun gear member 642, a ring gear member 644, and a planet carrier assembly member 646. The planet carrier assembly member 646 includes a plurality of pinion gears 647 mounted on a carrier member 649 and disposed in meshing relationship with both the ring gear member 644 and the sun gear member 642.

The planetary gear arrangement also includes seven torque-transmitting mechanisms 650, 652, 654, 656, 657, 658 and 659. The torque-transmitting mechanisms 650, 652 and 654 are stationary-type torque-transmitting mechanisms, commonly termed brakes or reaction clutches. The torque-transmitting mechanisms 656, 657, 658 and 659 are rotating-type torque-transmitting mechanisms, commonly termed clutches.

The input member 17 is continuously connected to the sun gear member 632 of the planetary gear set 630. The output member 19 is continuously connected with the carrier member 646 of the planetary gear set 640. The first interconnecting member 670 continuously connects the carrier member 626 with the ring gear member 634. The second interconnecting member 672 continuously connects the carrier member 636 with the ring gear member 644. The third interconnecting member 674 continuously connects the ring gear member 624 with the carrier member 646.

A first torque transmitting device, such as brake 650, selectively connects the carrier member 626 and ring gear member 634 via interconnecting member 670 with the transmission housing 660. A second torque transmitting device, such as brake 652, selectively connects the sun gear member 622 with the transmission housing 660. A third torque transmitting device, such as brake 654, selectively connects the sun gear member 642 with the transmission housing 660. A fourth torque transmitting device, such as clutch 656, selectively connects the sun gear member 622 with the sun gear member 632 which is continuously connected with the input member 17. A fifth torque transmitting device, such as clutch 657, selectively connects the carrier member 626 and ring gear member 634 via interconnecting member 670 with the sun gear member 632 which is continuously connected with the input member 17. A sixth torque transmitting device, such as clutch 658, selectively connects the carrier member 626 and ring gear member 634 via interconnecting member 670 with the ring gear member 624 and carrier member 646 via interconnecting member 674. A seventh torque transmitting device, such as clutch 659, selectively connects the ring gear member 624 and carrier member 646 via interconnecting member 674 with the sun gear member 642.

As set forth above, the truth table of FIG. 7b describes the engagement sequence of the torque-transmitting mechanisms utilized to provide one reverse drive ratio and at least seven forward speed ratios. The truth table also provides an example of the ratios that can be attained with the family members shown in FIG. 7a utilizing the sample tooth ratios given in FIG. 7b. The $N_{R1}/N_{S1}$ value is the tooth ratio of the planetary gear set 620; the $N_{R2}/N_{S2}$ value is the tooth ratio of the planetary gear set 630; and the $N_{R3}/N_{S3}$ value is the tooth ratio of the planetary gear set 640. Also shown in FIG. 7b are the ratio steps between single step ratios in the forward direction as well as the reverse to first ratio step ratio for 7-speed and 8-speed engagement schedules. For example, the first to second step ratio is 1.53 for each.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input shaft;
an output shaft;
first, second and third gear sets each having first, second and third members; said input shaft being continuously interconnected with at least one member of said gear sets, and said output shaft being continuously interconnected with another member of said gear sets;
a first interconnecting member continuously connecting said first member of said first gear set with said first member of said second gear set;
a second interconnecting member continuously connecting said second member of said second gear set with said first member of said third gear set;
a third interconnecting member continuously connecting said second member of said first gear set with said second member of said third gear set;
a first torque-transmitting mechanism selectively connecting said first interconnecting member with a stationary member;
a second torque-transmitting mechanism selectively connecting a member of said first gear set with said stationary member;
a third torque-transmitting mechanism selectively connecting a member of said third gear set with said stationary member;
a fourth torque-transmitting mechanism selectively connecting a member of said first gear set with a member of said first, second or third gear set which is continuously connected with said input member;
a fifth torque-transmitting mechanism selectively connecting said first or second interconnecting member with a member of said first, second or third gear set which is continuously connected with said input member;
a sixth torque-transmitting mechanism selectively connecting a member of said first or third gear set with one of said interconnecting members;
a seventh torque-transmitting mechanism selectively connecting a member of said third gear set with said third interconnecting member; and
wherein said six torque-transmitting mechanisms are engaged in combinations of two to establish at least seven forward speed ratios and at least one reverse speed ratio between said input shaft and said output shaft.

2. The transmission defined in claim 1, wherein each of said first, second and third gear sets are planetary gear sets.

3. The transmission defined in claim 1, wherein said first, second and third torque-transmitting mechanisms comprise brakes, and said fourth, fifth and sixth torque-transmitting mechanisms comprise clutches.

4. A multi-speed transmission comprising:
an input shaft;
an output shaft concentrically surrounding said input shaft;
a planetary gear arrangement having first, second and third planetary gear sets, each planetary gear set having first, second and third members;
said input shaft being continuously interconnected with at least one member of said planetary gear sets, and said output shaft being continuously interconnected with another member of said planetary gear sets;
a first interconnecting member continuously connecting said first member of said first planetary gear set with said first member of said second planetary gear set;
a second interconnecting member continuously connecting said second member of said second planetary gear set with said first member of said third planetary gear set;
a third interconnecting member continuously connecting said second member of said first planetary gear set with said second member of said third planetary gear set; and
six torque-transmitting mechanisms for selectively interconnecting said members of said planetary gear sets with a stationary member or with other members of said planetary gear sets, said six torque-transmitting mechanisms being engaged in combinations of two to establish at least seven forward speed ratios and at least one reverse speed ratio between said input shaft and said output shaft;
wherein a first of said six torque-transmitting mechanisms is operable for selectively connecting said first interconnecting member with said stationary member; and
wherein a second of said six torque-transmitting mechanisms is operable for selectively connecting a member of said first planetary gear set with said stationary member.

5. The transmission defined in claim 4, wherein a third of said six torque-transmitting mechanisms is operable for selectively connecting a member of said third planetary gear set with said stationary member.

6. The transmission defined in claim 5, wherein a fourth of said six torque-transmitting mechanisms is operable for selectively connecting a member of said first planetary gear set with a member of said first, second or third planetary gear set which is continuously connected with said input member.

7. The transmission defined in claim 6, wherein a fifth of said six torque-transmitting mechanisms is operable for selectively connecting said first or second interconnecting member with a member of said first, second or third planetary gear set which is continuously connected with said input member.

8. The transmission defined in claim 7, wherein a sixth of said six torque-transmitting mechanisms is operable for selectively connecting a member of said first or third planetary gear set with said first, second or third interconnecting member.

9. The transmission defined in claim 8 further comprising:
a seventh torque transmitting mechanism selectively connecting a member of said third planetary gear set with said third interconnecting member.

* * * * *